United States Patent
Lee

(10) Patent No.: US 8,331,927 B2
(45) Date of Patent: Dec. 11, 2012

(54) METHOD AND DEVICE FOR SUPPORTING CALL SERVICE

(75) Inventor: Ki Hun Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 285 days.

(21) Appl. No.: 12/685,958

(22) Filed: Jan. 12, 2010

(65) Prior Publication Data
US 2010/0178905 A1    Jul. 15, 2010

(30) Foreign Application Priority Data
Jan. 14, 2009  (KR) ................. 10-2009-0003067

(51) Int. Cl.
*H04W 4/00*  (2009.01)

(52) U.S. Cl. .............. 455/432.3; 455/435.1; 455/436; 455/417; 455/418; 455/415; 455/414.1; 455/407; 455/406; 455/558

(58) Field of Classification Search ........... 455/432.3, 455/435.1, 436, 417, 418, 415, 414.1, 407, 455/406, 558
See application file for complete search history.

(56) References Cited

U.S. PATENT DOCUMENTS

| | | | |
|---|---|---|---|
| 8,150,392 B1 * | 4/2012 | Mcconnell et al. | 455/432.1 |
| 2005/0101292 A1 * | 5/2005 | Fukui | 455/406 |
| 2006/0079224 A1 * | 4/2006 | Welnick et al. | 455/432.1 |
| 2008/0182552 A1 * | 7/2008 | Dinh et al. | 455/408 |
| 2009/0323659 A1 * | 12/2009 | Zhang | 370/338 |
| 2010/0009716 A1 * | 1/2010 | Lee et al. | 455/558 |
| 2010/0290337 A1 * | 11/2010 | Suvi et al. | 370/217 |

FOREIGN PATENT DOCUMENTS

| | | |
|---|---|---|
| KR | 2006-57372 | 5/2006 |
| KR | 2006057372 A * | 5/2006 |

OTHER PUBLICATIONS

Kai Rannenberg (Identity management in mobile cellular networks and related applications; vol. 9, Issue 1); Jan.-Mar. 2004, pp. 77-85.*

* cited by examiner

*Primary Examiner* — Ajit Patel
*Assistant Examiner* — Khai M Nguyen
(74) *Attorney, Agent, or Firm* — Cha & Reiter, LLC

(57) ABSTRACT

A method and a device for supporting a call service are provided. In the process of performing communication with another mobile communication terminal, a network identification number is detected from SID information received from a base station, a service provider of the other mobile communication terminal is determined based on the detected network identification number, and a subscriber information module that can use a communication service based on the determined service provider is recommended in the case of communicating with the other mobile communication terminal.

17 Claims, 7 Drawing Sheets

FIG . 4

SID_DB

| PHONE NUMBER | SID | SIM | INFORMATION |
|---|---|---|---|
| A | SID 1 | SIM 1 | DISCOUNT INFORMATION 1 |
| B | SID 2 | SIM 2 | DISCOUNT INFORMATION 2 |
| C | SID 3 | SIM 3 | DISCOUNT INFORMATION 3 |
| ⋮ | ⋮ | ⋮ | ⋮ |

METHOD AND DEVICE FOR SUPPORTING CALL SERVICE

CLAIM OF PRIORITY

This application claims the benefit of priority pursuant to 35 USC 119 from Korean Patent Application No. 10-2009-0003067 filed in the Korean Intellectual Property Office on Jan. 14, 2009, the entire contents of which are incorporated herein by reference in its entirety.

BACKGROUND OF THE INVENTION

1. Field of the Invention

The present invention relates to communication services, and more particularly, to a method and a device for supporting a call service according to network identification numbers.

2. Description of the Related Art

With the rapid development of technology, a mobile communication terminal, which is initially designed to provide simple voice communication and short message transmission functions, has developed to provide diverse functions such as video communication, electronic pocketbook, and Internet functions. Mobile communication terminals have also come to provide a digital camera function, both still image capture and moving image (video) capture.

A mobile communication terminal user, in order to use a mobile communication service, i.e. a call service, typically subscribes to a specified service provider, and performs calling within the coverage range of a base station provided by the corresponding service provider. In this case, the mobile communication terminal must be assigned with an identifier, i.e. a subscriber information module (SIM), for using the communication service of the corresponding service provider. The SIM is mounted within the terminal. In order for a mobile communication terminal user to use base stations of a plurality of service providers, the mobile communication terminal must be provided with subscriber information modules of all the respective service providers.

In the case of using a communication service, a mobile communication terminal user may habitually use only a specified subscriber information module (SIM), and in this case, the mobile communication terminal user cannot properly use services provided by the other service providers. Such services may include a call discount service between users belonging to the same communications company, a discount service within a network, and the like.

SUMMARY OF THE INVENTION

The present invention provides a method and a device for supporting a call service so that a specified service provided by a specified service provider can be used through classification of service providers when the call service is used.

In accordance with an aspect of the present invention, a method of supporting a call service includes: receiving from a base station information including a network identification number of at least one other mobile communication terminal as performing communication with the at least one other mobile communication terminal; determining a service provider corresponding to the network identification number; and storing in a database a phone number of the at least one other mobile communication terminal and an index corresponding to the phone number, and at least one subscriber information module information issued by the service provider.

In accordance with another aspect of the present invention, a device for supporting a call service includes: a radio frequency unit forming a communication channel with at least one other mobile communication terminal and receiving from a base station information including a network identification number of at least one other mobile communication terminal; a control unit determining at least one service provider from the network identification number; a database storing at least one of a phone number of the at least one other mobile communication terminal and an index corresponding to the phone number, and subscriber information module information issued by the at least one service provider; and a subscriber information module group including at least one subscriber information module corresponding to the at least one subscriber information module information.

According to the method and the device for supporting a call service according to embodiments of the present invention as described above, service providers are discriminated using network identification numbers, and a specified service provided by the discriminated service provider is selectively used to reduce the amount billed.

BRIEF DESCRIPTION OF THE DRAWINGS

The above features and advantages of the present invention will be more apparent from the following detailed description in conjunction with the accompanying drawings, in which:

FIG. 4 is a view illustrating in detail the configuration of a control unit according to an exemplary embodiment of the present invention;

DETAILED DESCRIPTION OF THE INVENTION

Figure 1:
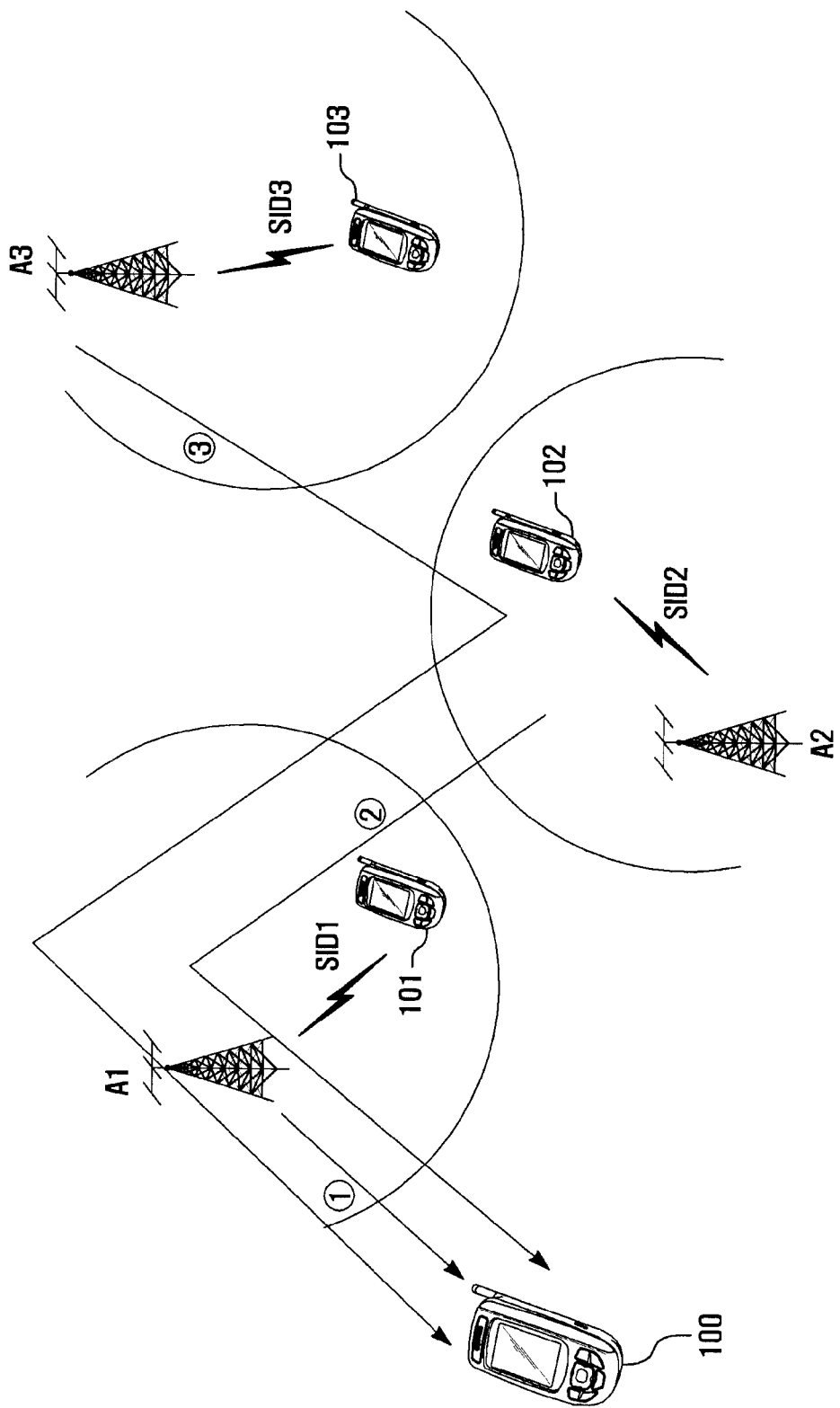
FIG. 1 is a view schematically illustrating the construction of a call service system according to an exemplary embodiment of the present invention.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in the drawings and are described in detail, herein, with the understanding that the present disclosure is to be considered as an exemplification of the principles of the invention and is not intended to limit the invention to the specific embodiments illustrated.

In the following description, a terminal that performs functions according to exemplary embodiments of the present invention is described as a mobile communication terminal, but the present invention is not limited thereto. That is, the terminal according to an exemplary embodiment of the present invention is a terminal on which a plurality of subscriber information modules can be mounted and which can use the corresponding communication service. Preferably, it will be apparent that the terminal according to an exemplary embodiment of the present invention can be applied to other types of information and communication appliances and multimedia appliances, such as a mobile communication terminal capable of using a call service, a mobile phone, a wired/wireless phone, a PDA (Personal Digital Assistant), and a smart phone, and their applications.

FIG. 1 is a view schematically illustrating the construction of a call service system according to an exemplary embodiment of the present invention. For convenience in explanation, it is assumed that three service providers exist, and the illustrated base stations represent base stations associated with a corresponding service provider. It is also assumed that the base stations can relay the call service with each other.

Referring to FIG. 1, the whole call service system according to an exemplary embodiment of the present invention includes first to third base stations A1, A2, and A3, and four mobile communication terminals 100, 101, 102 and 103. Here, it is assumed that the first base station A1 provides a call service based on a network identification number of a first service provider, the second base station A2 provides a call service based on a network identification number of a second service provider, and the third base station A3 provides a call service based on a network identification number of a third service provider. Also, a first mobile communication terminal 100 and a second mobile communication terminal 101 are terminals that belong to the first service provider (A1), a third mobile communication terminal 102 is a terminal that belongs to the second service provider (A2), and a fourth mobile communication terminal 103 is a terminal that belongs to the third service provider (A3). It is also assumed that the first mobile communication terminal includes all the subscriber information modules of the three service providers. In the call service system as described above, the first mobile communication terminal 100 can use the call service using the first service subscriber information module in the case of communicating with the second mobile communication terminal 101, can use the call service using the second service subscriber information module in the case of communicating with the third mobile communication terminal 102, and can use the call service using the third service subscriber information module in the case of communicating with the fourth mobile communication terminal 103. Hereinafter, cases in which the respective subscriber information modules are used will be described in more detail.

First, the case shown as "①" in FIG. 1 represents the case in which the first mobile communication terminal 100 uses the call service together with the second mobile communication terminal 101. A user of the first mobile communication terminal 100 transmits a call request message to the first base station A1 in order to form a communication channel with the second mobile communication terminal 101 within a communication permission range of the first base station A1. Then, the first base station A1 confirms the phone number of the second mobile communication terminal 101 from the call request message, collects information about the second mobile communication terminal 101 using an HLR (Home Location Register) and a VLR (Visitor Location Register) included in the mobile communication system, and finds the position of the second mobile communication terminal 101 to transmit the call request message to the second mobile communication terminal 101. In the case in which the second mobile communication terminal 101 comes into the communication range of the first base station A1, the first base station A1 recognizes that the second mobile communication terminal 101 is positioned within the communication range of base station A1 through an initialization process for recognizing the subscription of the second mobile communication terminal 101. If the first mobile communication terminal 100 transmits a call request message, the first base station A1 transmits the call request message to the second mobile communication terminal 101. Thereafter, when the second mobile communication terminal 101 responds to the call request message, the first base station A1 forms a communication channel between the first mobile communication terminal 100 and the second mobile communication terminal 101, and transmits a first SID (System Information Data) information SID1 that includes the network identification number of the second mobile communication terminal 101 to the first mobile communication terminal 100. The first mobile communication terminal 100 can confirm the service provider of the second mobile communication terminal 101 using the network identification number of the second mobile communication terminal 101 included in the first SID information SID1. Then, if the call with the second mobile communication terminal 101 is ended, the first mobile communication terminal 100 stores the network identification number of the second mobile communication terminal 101, and can confirm which service provider the second mobile communication terminal 101 had used. Thereafter, if the first mobile communication terminal 100 intends to communicate with the second mobile communication terminal 101, the first mobile communication terminal can recommend use of a specified subscriber information module based on the service provider information of the second mobile communication terminal 101 previously stored. As described above, if the second mobile communication terminal 101 belongs to the first service provider, the first SID information SID1 includes the above-described information, and is transmitted to the second mobile communication terminal. In the case in which the first mobile communication terminal 100 communicates with the second mobile communication terminal 101 in accordance with the subscriber information module given from the first service provider and whether the first mobile communication terminal is a discount service subscriber within a network, the first mobile communication terminal 100 may recommend to use the first subscriber information module so as to use the discount service within the network.

In a similar manner to the path labeled as "①", if the third mobile communication terminal 102 exists within the communication range of the second service subscriber (i.e., second base station A2) as shown by the path labeled in "②" in which the first mobile communication terminal 100 and the third communication terminal 102 use the call service, the third mobile communication terminal 102 can form a communication channel with the first mobile communication terminal 100 through the first base station A1 and the second base station A2. In this case, the first base station A1 supports the communication of the first mobile communication terminal 100, the second base station A2 supports the communication of the third mobile communication terminal 102, and the first base station A1 and the second base station A2 can relay signals required for the communication with each other. After the communication with the third mobile communication terminal 102 is ended, the first mobile communication terminal 100 can confirm the network identification number of the second mobile communication terminal 102 from the second system information SID2 transferred from the second base station A2, and store the same in a storage unit.

In the case of the path referred to as "③" in which the first mobile communication terminal 100 and the fourth mobile communication terminal 103 use the call service, the fourth mobile communication terminal 103 exists within the communication range of the third base station A3 (i.e., third service subscriber). Then, the fourth mobile communication terminal 103 can form a communication channel with the first mobile communication terminal 100 through the second base station A2 and the first base station A1. Here, the third base station A3 may support and perform direct communication with the first base station A1 without passing through the second base station A2. On the other hand, in order to communicate with the fourth mobile communication terminal 103, the first mobile communication terminal 100 receives the third system information SID3 from the third base station A3, and confirms the network identification number of the third mobile communication terminal 103 through the third system information SID3.

As described above, in the call service system according to an embodiment of the present invention, if the first mobile communication terminal 100, which has three subscriber modules and subscribes to the respective discount services within the network, intends to communicate with a specified mobile communication terminal, it can recommend the use of a specified subscriber module through the network identification number of the specified mobile communication terminal among the three subscriber modules.

On the other hand, although the first to third base stations A1, A2, and A3 appear to be separated from one anther in the drawing, the respective base stations may actually have the same or similar communication support regions, a specified service provider may have a communication support region that is wider than those of other service providers. Also, in cooperation with the service providers, two service providers may use one base station.

Figure 2:
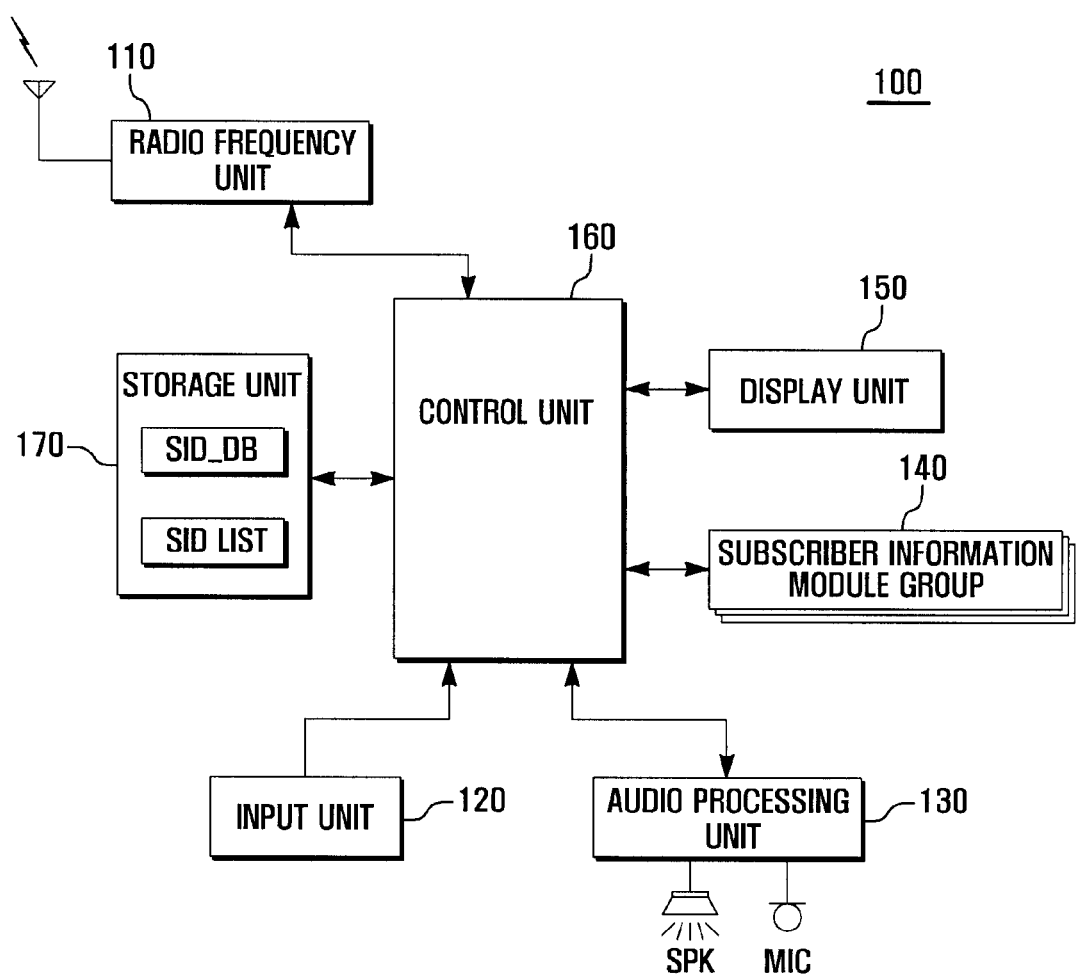
FIG. 2 is a block diagram schematically illustrating the configuration of a mobile communication terminal according to an exemplary embodiment of the present invention.

FIG. 2 is a block diagram schematically illustrating the configuration of the first mobile communication terminal according to an exemplary embodiment of the present invention. Here, the internal configuration of the first mobile communication terminal 100 may also be applied to other mobile communication terminals, i.e. the second mobile communication terminal 101, the third mobile communication terminal 102, and the fourth mobile communication terminal 103 in the same manner.

Referring to FIG. 2, the first mobile communication terminal 100 according to an embodiment of the present invention includes a radio frequency unit 110, an input unit 120, an audio processing unit 130, a subscriber information module group 140, a display unit 150, a storage unit 170, and a control unit 160.

In the case in which the first mobile communication terminal 100 according to an embodiment of the present invention performs communication with other mobile communication terminals using the radio frequency unit 110, it receives system information from the base station that supports the corresponding mobile communication terminal, and confirm the network identification number of another mobile communication terminal through the system information. The first mobile communication terminal 100 stores the network identification number through mapping of the network identification number on the index of another mobile communication terminal, e.g. the phone number thereof. In the case of intending to communicate with another mobile communication terminal, the first mobile communication terminal 100 notify the network identification number of another mobile communication terminal, and provides additional information such as phone number. Hereinafter, the configuration of the first mobile communication terminal 100 will be described in more detail.

The radio frequency unit 110 transmits and receives image call data under the control of the control unit 160. The radio frequency unit 110 includes a radio frequency transmitting unit for up-converting and amplifying the frequency of a transmitted signal, and a radio frequency receiving unit for low-noise-amplifying and down-converting the frequency of a received signal. In particular, the radio frequency unit 110 according to an embodiment of the present invention forms a communication channel based on the subscriber information module selected by the mobile communication terminal user. That is, if the first mobile communication terminal 100 has three subscriber information modules and selects the first subscriber information module among them, the radio frequency unit 110 forms a communication channel based on the base station for the service subscriber that supports the first subscriber module. Also, in the case of forming a communication channel with another mobile communication terminal, the radio frequency unit 110 receives the system information including the network identification number of another mobile communication terminal from the base station, and transfers the system information to the control unit 160.

The input unit 120 includes a plurality of input keys and function keys for inputting numeral or text information and setting various kinds of functions. The function keys include direction keys, side keys, and short-cut keys set to perform specified functions (not shown). The input unit 120 generates a key signal input in relation to the user setting and function control of a mobile communication terminal, and transfers the key signal to the control unit 160. In particular, the input unit 120 generates an input signal for selecting one of subscriber information modules in the subscriber information module group 140, a signal corresponding to an input of the number of a counterpart mobile communication terminal to be called based on the corresponding subscriber information module, an input signal for forming a communication call based on the input number, and an end call input signal, and transfers the generated signal to the control unit 160.

The audio processing unit 130 includes a speaker SPK reproducing audio data transmitted or received during calling, and a microphone MIC collecting a user's voice or other audio signal during a video calling. Particularly, in the case of forming a communication channel based on the phone number of a specified counterpart mobile communication terminal, the audio processing unit 130, according to an embodiment of the present invention, may output an notification to recommend the corresponding subscriber information module if the counterpart mobile communication terminal uses the same service provider as that of one subscriber information module in the subscriber information module group 140 of the first mobile communication terminal 100. The notification may be a beep sound or a guidance sound.

The subscriber information module group 140 includes a plurality of subscriber information modules (SIMs). The subscriber information modules are assigned from the respective service providers to the user of the first mobile communication terminal, and may be arranged in a space provided on one side of the mobile communication terminal. The respective subscriber information module belonging to the subscriber information module group 140 is detachable, and when the subscriber information module is inserted into the space (not shown), it communicates with the control unit 160, so that the communication service or information stored in the module can be used. The subscriber information module group 140 includes not only SIMs but also cards corresponding to USIM (Universal Subscriber Identity Module) or other information modules, which may be added or removed in accordance with user's operation.

The display unit 150 provides a region for providing a display screen required for operation of the first mobile communication terminal 100. For example, the display unit 150 may output a preset standby screen after the completion of booting, a menu screen for selecting diverse functions of the mobile communication terminal, a screen for supporting selection of lower menus of the respective menu, a screen according to selection and activation of a specified menu, and the like. Particularly, the display unit 150 after the call is ended with another mobile communication terminal, outputs a screen for storing the network identification number of the another mobile communication terminal, a screen for showing the network identification numbers mapped on other mobile communication terminals stored in the storage unit 170, a screen for recommending the subscriber information module in the case of forming a communication channel with a specified mobile communication terminal, and the like. These screens may be displayed concurrently in an overlapping, or non-over-lapping manner. Or may be displayed sequentially as the user responds to each screen. Also, the display unit 150 outputs information stored in an SID database SID_DB of the storage unit 170. In this case, the display unit 150 may sort the information stored in the SID database SID_DB by service providers to output the sorted information. The display unit 150 may be implemented by an LCD (Liquid Crystal Display), and thus, the display unit 150 may be provided with an LCD control unit, a memory for storing data, an LCD display device, and the like. In the case of implementing the LCD as a touch screen type, the screen of the display unit 150 may be used as the input unit.

The storage unit 170 stores an application program required to perform functions according to an embodiment of the present invention, an application program required to support the communication service, an application program for operating the respective subscriber information modules stored in the subscriber information module group 140, user data, and application program data for providing recommendation of the subscriber information modules according to an embodiment of the present invention. The storage unit 170 may be roughly divided into a program region and a data region.

In the program region, an operating system (OS) for booting the mobile communication terminal, application programs required for other optional functions of the mobile communication terminal, e.g. sound reproduction function, image or moving image reproduction function, and the like, are stored. Particularly, in the program region, a module recommendation application program for providing the subscriber information module recommendation function is stored. The module recommendation application program confirms the service providers of other mobile communication terminals based on the SID list stored in the data region, and operates to update the SID database SID_DB. Also, in the case in which the user of the first mobile communication terminal 100 intends to communicate with another mobile communication terminal, the module recommendation application program confirms the service provider of the other mobile communication terminal, and operates to establish a popup window for recommending the use the same subscriber information module. Accordingly, in the case in which the first mobile communication terminal 100 registers a discount service within a network in a specified service provider, the communication service can be used based on the subscriber information module that can provide a discount service.

Figure 3:
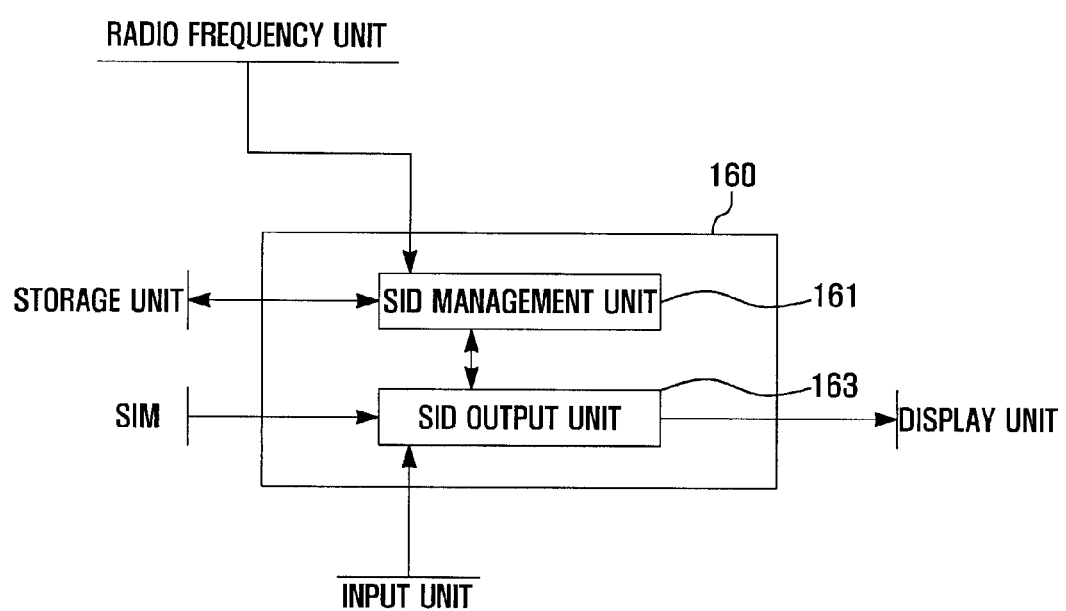
FIG. 3 is a view illustrating an example of an SID database structure according to an exemplary embodiment of the present invention.

The data region is a region in which data that is produced according to the use of the mobile communication terminal is stored. In the data region, data recorded by the user and user data related to diverse optional functions provided by the mobile communication terminal, for example, moving images, phone book data, audio data, and information corresponding to the corresponding content or user data, are stored. Particularly, in the data region according to an embodiment of the present invention, data stored in the subscriber information module group 140 may be pre-stored so as to promptly read the corresponding data. Also, in the data region, an SID list and an SID database SID_DB may be stored. The SID list includes information for reporting which service provider a specified network identification number indicates. The SID list may be removed according to the designer's condition. In the SID database SID_DB, information regarding the network identification numbers and phone numbers of the mobile communication terminals, is mapped onto each other, and stored as illustrated in FIG. 3. The first mobile communication terminal 11 may detect the network identification number from the SID information that is received from the corresponding base station when performing a call communication with another mobile communication terminal. In the case illustrated in FIG. 3, the first mobile communication terminal 100 stores the network identification numbers through mapping of the network identification numbers of other mobile communication terminals. In addition, in the SID database SID_DB, discount information by subscriber information modules may be stored. For example, in the case of communicating with a mobile communication terminal having a phone number of "A", the first mobile communication terminal 100 receives the first SID information SID1 from the first base station of the first service provider, and in this case, the subscriber information module corresponding to the first service provider may be the first subscriber information module SIM1. On the other hand, if the first mobile communication terminal 100 subscribes to the first discount service (i.e. discount information 1), the corresponding information may be stored in the SID database SID_DB. (see FIG. 4). Also, the corresponding information may be directly written after the user of the first mobile communication terminal 110 subscribes to the discount service. That is, the user may output the SID database onto the display unit 150, and may directly write the discount service information to which the user has subscribed, such as a discount service within a network, a family discount service, a designated number discount service, and the like. For this, the control unit 160 may support a menu item for outputting a window for editing the information stored in the SID database.

In a similar manner, in the SID database SID_DB, the mobile communication terminal having a phone number of "B" may be stored as the second SID information SID2, the second subscriber information module SIM2, and the second discount service (discount information 2), and the mobile communication terminal having a phone number of "C" may be stored as the third SID information SID3, the third subscriber information module SIM3, and the third discount service (discount information 3). In the description of the present invention, it is exemplified that the phone number of another mobile communication terminal, SID information corresponding to the network identification number, subscriber information module information, and the discount service information are all stored in the SID database. However, it is also possible to store only the phone number of another mobile communication terminal, a name or nickname corresponding to the phone number, or an index including information according to the user's setting in the SID database, and a recommendation of the subscriber information module may be supported based on the phone number of another mobile communication terminal.

In the case in which the first mobile communication terminal uses the call service, the SID database SID_DB is loaded under the control of the control unit 160, and information according to the phone number of another mobile communication terminal may be output to the display unit 150. When the user communicates with another mobile communication terminal based on the information output to the display unit 150, the user can select which subscriber information module the user uses.

The control unit 160 controls the power supply to the respective constituent elements, and controls performing of diverse functions of the mobile communication terminal through control of signal flow among the respective constituent elements. In an embodiment of the present invention, in the case of supporting the call service of the first mobile communication terminal 100, the control unit 160 confirms the SID database SID_DB stored in the storage unit 170, and controls the schedule information to be output to the display unit 150. If the call connection with another mobile communication terminal is ended, the control unit 160 may control the update of the SID database SID_DB. For this, the control unit 160, as illustrated in FIG. 3, may include an SID management unit 161 and an SID output unit 163.

The SID management unit 161 manages data storage and change of the SID database SID_DB stored in the storage unit 170. More specifically, in the case in which the first mobile communication terminal 100 performs the call communication with another mobile communication terminal having a specified phone number and then terminates the call communication, the SID management unit 161 detects the network identification number of the other mobile communication terminal from the SID information received from the base station that supports the corresponding mobile communication terminal. Then, the SID management unit 161 may generate and store an SID database SID_DB by mapping the detected network identification number onto the corresponding mobile communication terminal. On the other hand, even though the information about another mobile communication terminal and the network identification number are pre-stored, the service provider of the corresponding mobile communication terminal may be changed. In this case, the SID management unit 161 confirms whether the network identification number has been changed by confirming the network identification number. If the network identification number has been changed, the SID management unit 161 operates to update the SID database SID_DB. On the other hand, if the first mobile communication terminal 100 subscribes to the discount service that is provided from a service provider supporting a specified subscriber information module, the SID management unit 161 operates to update the SID database SID_DB based on this information. If the first mobile communication terminal 100 subscribes to a specified discount service, the service provider may send a message for reporting the subscription of the discount service to the first mobile communication terminal 100. If such a message is received, the SID management unit 161 operates, based on this information, to update the region of the SID database SID_DB in which the discount service information is written.

If the first mobile communication terminal 100 inputs the phone number of another mobile communication terminal or activates an index that corresponds to the corresponding phone number from a phone book (e.g., a contact list), the SID output unit 163 may confirm from the SID database SID_DB the subscriber information module corresponding to the phone number and the discount service information. Also, the SID output unit 163 may operate to output a popup window for recommending the subscriber information module and the discount service information to the display unit 150. If the user selects the subscriber information module recommended by the SID output unit 163 in the popup window, the SID output unit transfers this selection to the control unit 160, so that the control unit 160 supports forming of a communication channel based on the corresponding subscriber information module.

As described above, according to the call service system and the mobile communication terminal according an embodiment of the present invention, information corresponding to the service providers of other mobile communication terminals is collected and stored, and the communication channel is formed based on the corresponding mobile communication terminal and the specified subscriber information module.

As described above, the configuration of the call service system and the mobile communication terminal according to an embodiment of the present invention has been described. Hereinafter, a method of supporting a call service according to an embodiment of the present invention will be described in detail with reference to the accompanying drawings.

Figure 5:
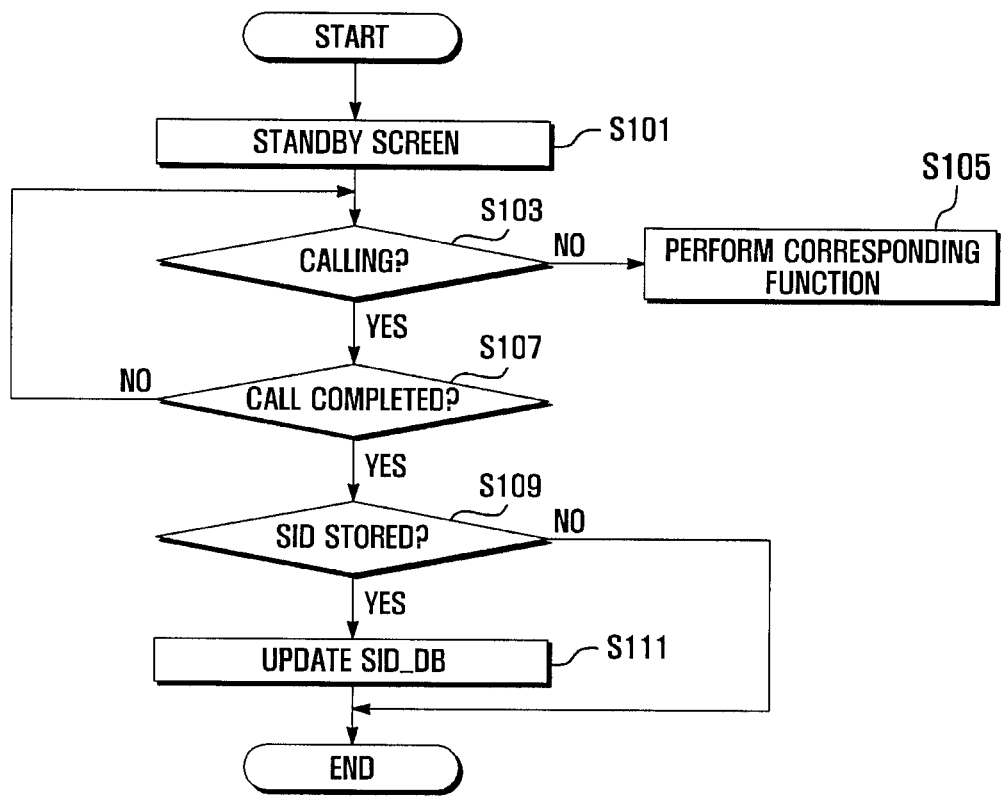
FIG. 5 is a flowchart illustrating a method of updating an SID database according to an exemplary embodiment of the present invention.

FIG. 5 is a flowchart illustrating a method of updating an SID database according to an exemplary embodiment of the present invention.

Referring to FIG. 5, if a power is supplied to the mobile communication terminal, the control unit 160 of the mobile communication terminal initializes the respective constituent elements of the mobile communication terminal using the supplied power, and performs a booting process. After the booting is completed, the mobile communication terminal operates to output a preset standby screen to the display unit in step S101.

Then, the mobile communication terminal confirms whether the call service is used in step S103. Here, the use of the call service of the mobile communication terminal may include both a call termination service that is created by responding to the communication call request from another mobile communication terminal, and a call origination service that is created when the mobile communication terminal transmits a communication call request to another mobile communication terminal. If the call service is not used in step S103, the mobile communication terminal goes to step S105 and performs user functions of the mobile communication terminal, e.g. file reproduction function, broadcast viewing function, image collection function, internet access, etc, in accordance with the user request.

On the other hand, if the mobile communication terminal uses the call service in step S103, it can transmit or receive audio, video, or other data based on the communication channel formed to communicate with another mobile communication terminal. Then, the mobile communication terminal confirms whether the call is ended in step S107. The call end may be confirmed by detecting, under the control of the control unit, the user's pressing of a call end button, the release of the communication channel through performing of sliding for the call end or folder closing, or the call end according to the call end request of another mobile communication terminal.

If the call is not ended in step S107, i.e., if the call continues, the mobile communication terminal control unit returns to step S103, and repeats the corresponding processes. On the other hand, if the call is ended in step S107, the control unit goes to step S109, and confirms whether to store the SID received from the base station that supports another mobile communication terminal. For this, the control unit may operate to output a popup window for confirming whether to store SID information. Here, the control unit may operate to automatically store SID information after the call is ended without any process of confirming whether to store the SID in step S109. If the step S107 is omitted, the control unit may also omit the step S109, and operates to perform step S111. The process goes from S103 directly to storing SID automatically without any process.

If an input signal for storing the SID is detected in step S109, the control unit 160 goes to step S111, detects the network identification number included in the SID information, and updates the SID database SID_DB stored in the storage unit. On the other hand, if the storing of the SID information is not performed in step S109, the control unit ends the SID database updating process without a separate update of the SID database SID_DB.

Although it is exemplified that the control unit detects the SID information and updates the SID database based on the detected SID information as described above, the control unit according to an embodiment of the present invention may detect the received SID information by performing a background processing during calling, and update the SID database based on the detected SID information.

Figure 6:
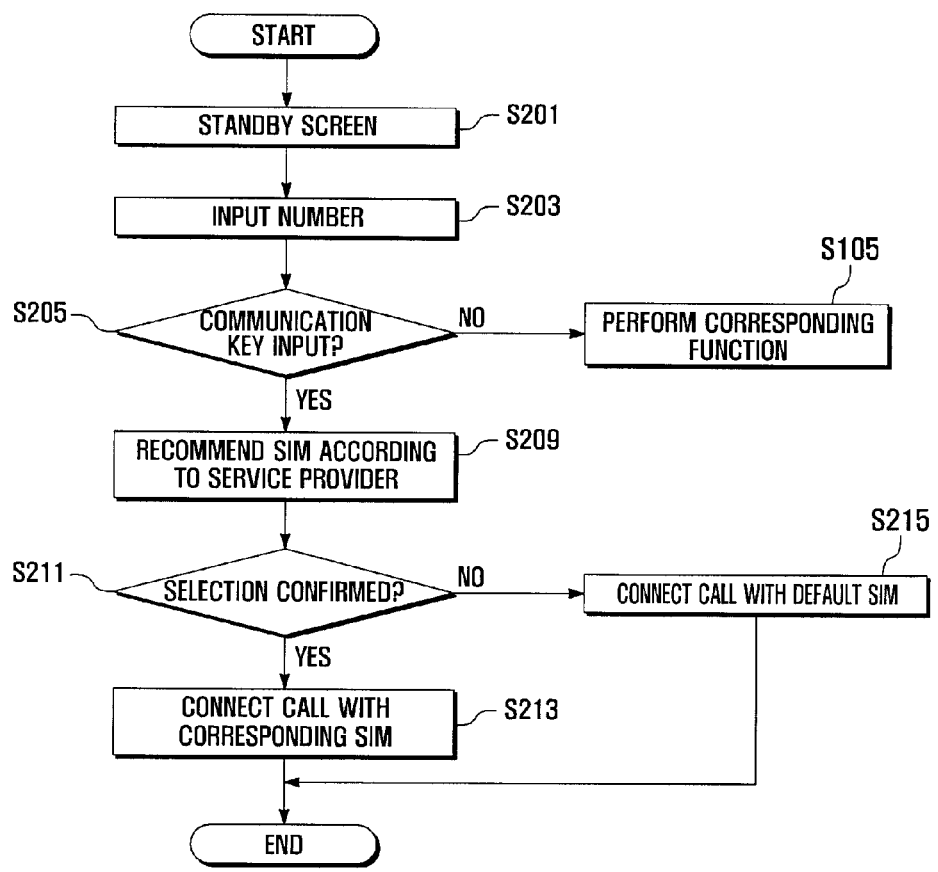
FIG. 6 is a flowchart illustrating a method of recommending a subscriber information module according to an exemplary embodiment of the present invention.

FIG. 6 is a flowchart illustrating a method of recommending the subscriber information module according to an exemplary embodiment of the present invention.

Referring to FIG. 6, according to the method of recommending the subscriber information module, if the power is supplied to the mobile communication terminal, the control unit of the mobile communication terminal initializes the respective constituent elements of the mobile communication terminal using the supplied power, and performs a booting process. After the booting process is completed, the mobile communication terminal operates to output a preset standby screen to the display unit in step S201.

Then, the control unit of the mobile communication terminal performs an input of the number corresponding to the phone number of another mobile communication terminal in accordance with the user's request in step S203. That is, when the user directly presses a key(s) corresponding to the phone number of another mobile communication terminal using the input unit, or selects the phone number of another mobile communication terminal using data stored in the phone book (contact list), the control unit of the mobile communication terminal performs the input of the corresponding phone number.

Then, the control unit confirms whether the call key is input in step S205. If the call key is not input in step S205, the control unit goes to step S105, and supports performing of the corresponding function of the mobile communication terminal, such as a search function, a message service function based on the input number, or the like, as previously discussed.

On the other hand, if the call key is input in step S205, the control unit goes to step S209 to perform SIM recommendation in accordance with a service provider. More specifically, the control unit confirms the network identification number of another mobile communication terminal that corresponds to the input number through the SID database. Accordingly, the control unit confirms the service provider based on the network identification number, detects the subscriber information module that corresponds to the corresponding service provider based on the SID database, and recommends forming a communication channel with another mobile communication terminal having the input number based on the subscriber information module. For recommendation, the control unit operates to output a popup window for selecting the subscriber information module.

Then, the control unit confirms whether the subscriber information module recommended by the control unit is selected through the input unit in step S211. The selection confirmation may be performed by detecting a signal input from the input unit. If the subscriber information module recommended by the control unit is not selected in step S211, the control unit goes to step S215, and performs a call connection using a default SIM. Here, the default SIM may be a SIM set in the mobile communication terminal or a SIM used according to the user's setting.

On the other hand, if the control unit confirms that the input signal for selecting the subscriber information module recommended by the control unit has been generated in step S211, the control unit goes to step S213, and operates to perform the call connection based on the recommended subscriber information module, i.e., based on the corresponding SIM.

In the foregoing description, it is exemplified that the SID database information is detected with respect to the input phone number after the call key is input. However, it would be recognized that the detection of the SID database information may be automatically performed after the phone number is input.

As described above, according to the method according to an embodiment of the present invention, the service subscriber can be known based on the network identification number of another mobile communication terminal, and it is recommended to use the subscriber information module that corresponds to the service subscriber. Accordingly, in the case in which the mobile communication terminal user supports the discount service within the network of a specified service provider, the discount service can be recommended to the user when the user communicates with another mobile communication terminal.

Figure 7:
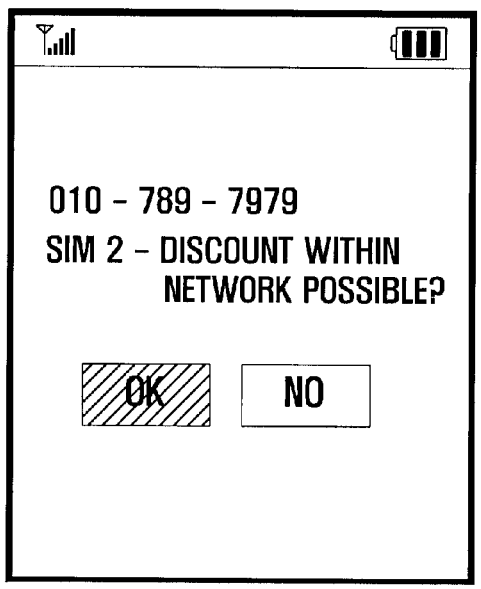
FIG. 7 is a view illustrating an example of a display screen interface according to an exemplary embodiment of the present invention.

FIG. 7 is a view illustrating an example of a display screen interface according to an exemplary embodiment of the present invention.

Referring to FIG. 7, the user of the mobile communication terminal according to an embodiment of the present invention, in order to phone another mobile communication terminal having a specified phone number, e.g. "010-789-7979", a user may directly input keys corresponding to the phone number using the input unit, or may search for and input information stored in a phone book (contact list). Thereafter, in the case in which the user of the mobile communication terminal input a call key, the mobile communication terminal searches the SID database stored in the storage unit based on the phone number, and detects the SID information of the portable terminal having the corresponding phone number. That is, the mobile communication terminal can recognize through the SID database that the user associated with the inputted phone number uses a specified network identification number indicating a specified service provider and the subscriber information module corresponding to the specified service provider. Then, the mobile communication terminal operates to output the associated subscriber information module, e.g. the second subscriber information module SIM2 onto the display unit. Also, if there is discount service information based on the subscriber information module in the SID database, the mobile communication terminal outputs the discount service information, e.g. "discount within a network possible," together with the subscriber information module information.

The mobile communication terminal may output a popup window to confirm whether to perform the call connection based on the second subscriber information module SIM2. In the case in which a user selects "OK" in the popup window, the mobile communication terminal operates to form a communication channel with another mobile communication terminal having the phone number based on the second subscriber information module SIM2. On the other hand, if the user selects "NO" in the popup window, the mobile communication terminal operates to form a communication channel with another mobile communication terminal having the phone number based on the subscriber information module set by default.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A method of supporting a call service at a mobile communication terminal including a plurality of subscriber information modules for a respective plurality of service providers, the method comprising:
    receiving from a base station information including a network identification number of at least one other mobile communication terminal for performing communication with the at least one other mobile communication terminal;
    determining a service provider corresponding to the network identification number;
    storing in a database at least one of a phone number of the at least one other mobile communication terminal and an index corresponding to the phone number, and at least one subscriber information module information issued by the service provider of said at least one other mobile communication terminal; and
    outputting a popup window for selecting a subscriber information module and discount service information onto a display unit,
    wherein outputting the popup window comprises recommending a particular subscriber information module from among the plurality of subscriber information modules in order to receive discount services when communicating with said at least one other mobile communication terminal.

2. The method of claim 1, wherein determining the service provider and storing in the database are automatically performed after a call with the at least one other mobile communication terminal is completed.

3. The method of claim 1, wherein recommending the subscriber information module that corresponds to a specified mobile communication terminal comprises using the database during a call with the specified mobile communication terminal.

4. The method of claim 1, further comprising:
    forming a communication channel with the specified mobile communication terminal based on the selected subscriber information module in the case of selecting the subscriber information module.

5. The method of claim 1, wherein storing in the database further comprises at least one of:
    storing the network identification number in the database; and
    storing the discount service information based on the subscriber information module in the database.

6. A device for supporting a call service comprising:
    a radio frequency unit forming a communication channel with at least one other mobile communication terminal and receiving from a base station information including a network identification number of at least one other mobile communication terminal;
    a control unit determining at least one service provider from the network identification number;
    a database storing at least one of a phone number of the at least one other mobile communication terminal and an index corresponding to the phone number, and subscriber information module information issued by the at least one service provider; and
    a subscriber information module group including a plurality of subscriber information modules corresponding to the at least one subscriber information module information;
    wherein the plurality of subscriber information modules are respectively associated with a plurality of service providers; and
    a display unit outputting a popup window for selecting a subscriber information module and discount service information,
    wherein the display unit outputting the popup window comprises recommending a particular subscriber information module from among the plurality of subscriber information modules in order to receive discount services when communicating with said at least one other mobile communication terminal.

7. The device of claim 6, wherein the control trait discriminates the service provider after a call with the at least one other mobile communication terminal is completed, and automatically stores the phone number or the index and the subscriber information module information in the database.

8. The device of claim 6, wherein the display unit for outputs information on recommending a subscriber information module that corresponds to a specified mobile communication terminal using the database during a call with the specified mobile communication terminal.

9. The device of claim 6, wherein the display unit outputs a popup window for selecting the subscriber information module.

10. The device of claim 6, wherein the radio frequency unit forms a communication channel with the specified mobile communication terminal based on the selected subscriber information module in the case of selecting the subscriber information module output onto the popup window.

11. The device of claim 6, wherein the database further comprises at least one of the network identification number and subscribed discount service information based on the subscriber information module.

12. A device comprising:
a processor in communication with a memory, the memory including code which when accessed by the processor causes the processor to:
receive from a base station information including a network identification number of at least one other mobile communication terminal for performing communication with the at least one other mobile communication terminal;
determine a service provider corresponding to the network identification number; and
store in a database at least one of a phone number of the at least one other mobile communication terminal and an index corresponding to the phone number, and at least one subscriber information module information issued by the service provider; and
recommend a particular subscriber information module from among the plurality of subscriber information modules in order to receive discount services when communicating with said at least one other mobile communication terminal,
wherein recommending comprises outputting a popup window for selecting the subscriber information module and discount service information onto a display unit.

13. The device of claim 12, wherein determining the service provider and storing in the database are automatically performed after a call with the at least one other mobile communication terminal is completed.

14. The device of claim 12, further comprising recommending a-the subscriber information module that corresponds to a specified mobile communication terminal using the database during a call with the specified mobile communication terminal.

15. The device of claim 12, further comprising:
forming a communication channel with the specified mobile communication terminal based on the selected subscriber information module in the case of selecting the subscriber information module.

16. The device of claim 12, further comprising a plurality of subscriber information modules associated with a respective plurality of service providers, wherein the processor outputs a recommended use of a particular subscriber information module from among the plurality of subscriber information modules in order to receive discount services when communicating with said at least one other mobile communication terminal.

17. The device of claim 12, wherein storing in the database further comprises at least one of: storing the network identification number in the database; and storing the discount service information based on the subscriber information module in the database.

* * * * *

UNITED STATES PATENT AND TRADEMARK OFFICE
CERTIFICATE OF CORRECTION

PATENT NO. : 8,331,927 B2
APPLICATION NO. : 12/685958
DATED : December 11, 2012
INVENTOR(S) : Ki Hun Lee It is certified that error appears in the above-identified patent and that said Letters Patent is hereby corrected as shown below:

In the Claims

Column 16, Claim 14, Line 6 should read as follows:
--...recommending the subscriber information...--

Signed and Sealed this
Twenty-third Day of April, 2013

Teresa Stanek Rea
*Acting Director of the United States Patent and Trademark Office*